(12) United States Patent
Ayucar

(10) Patent No.: US 11,846,969 B1
(45) Date of Patent: Dec. 19, 2023

(54) UI STATE IDENTIFICATION, NAVIGATION AND CRAWLING

(71) Applicant: Electronic Arts Inc., Redwood City, CA (US)

(72) Inventor: Iñaki Ayucar, Ayegui (ES)

(73) Assignee: Electronic Arts Inc., Redwood City, CA (US)

(*) Notice: Subject to any disclaimer, the term of this patent is extended or adjusted under 35 U.S.C. 154(b) by 0 days.

(21) Appl. No.: 18/192,009

(22) Filed: Mar. 29, 2023

(51) Int. Cl.
G06F 8/38 (2018.01)
G06F 11/36 (2006.01)

(52) U.S. Cl.
CPC ............ G06F 8/38 (2013.01); G06F 11/3668 (2013.01)

(58) Field of Classification Search
None
See application file for complete search history.

(56) References Cited

U.S. PATENT DOCUMENTS

| | | | | |
|---|---|---|---|---|
| 8,941,666 B1 * | 1/2015 | Kovar | ............. | G06F 8/30 345/473 |
| 10,546,027 B1 * | 1/2020 | Parent | ............... | G06F 16/90324 |
| 10,569,174 B1 * | 2/2020 | Wheeler | ............. | A63F 13/42 |
| 2014/0243079 A1 * | 8/2014 | Tsukioka | ............ | A63F 13/525 463/29 |
| 2014/0274384 A1 * | 9/2014 | Boswell | ............. | A63F 13/73 463/31 |
| 2015/0301693 A1 * | 10/2015 | Wheeler | ........... | G06Q 30/0255 715/716 |
| 2020/0139231 A1 * | 5/2020 | Colenbrander | ....... | A63F 13/77 |
| 2020/0346121 A1 * | 11/2020 | Beaumont | ............. | A63F 13/49 |
| 2022/0408138 A1 * | 12/2022 | Wu | ................. | H04N 21/44227 |
| 2023/0179498 A1 * | 6/2023 | Colenbrander | ...... | A63F 13/355 709/224 |

* cited by examiner

*Primary Examiner* — Toan H Vu
(74) *Attorney, Agent, or Firm* — Lee & Hayes, P.C.

(57) ABSTRACT

A UI state crawler system may allow for the crawling of a video game UI that may identify and map UI states of the video game. The UI state crawler system may determine a user interface (UI) state identifier (ID) for a UI state of a UI of a video game based at least in part on a plurality of node IDs corresponding to a plurality of nodes of a hierarchical structure of the UI and determine a UI state map does not include a UI state map node corresponding to the UI state ID. In response to the determining the UI state map does not include the UI state map node corresponding to the UI state ID, the UI state crawler system may generate an updated UI state map including the UI state map node corresponding to the UI state ID.

20 Claims, 9 Drawing Sheets

UI STATE IDENTIFICATION, NAVIGATION AND CRAWLING

BACKGROUND

Video gaming allows for players to play a variety of electronic and/or video games. User interfaces (UIs) of video games may include thousands of possible states and transitions between states. The number of states and transitions may make state tracking for identifying and fixing bugs, user interface issues and other problems complex.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
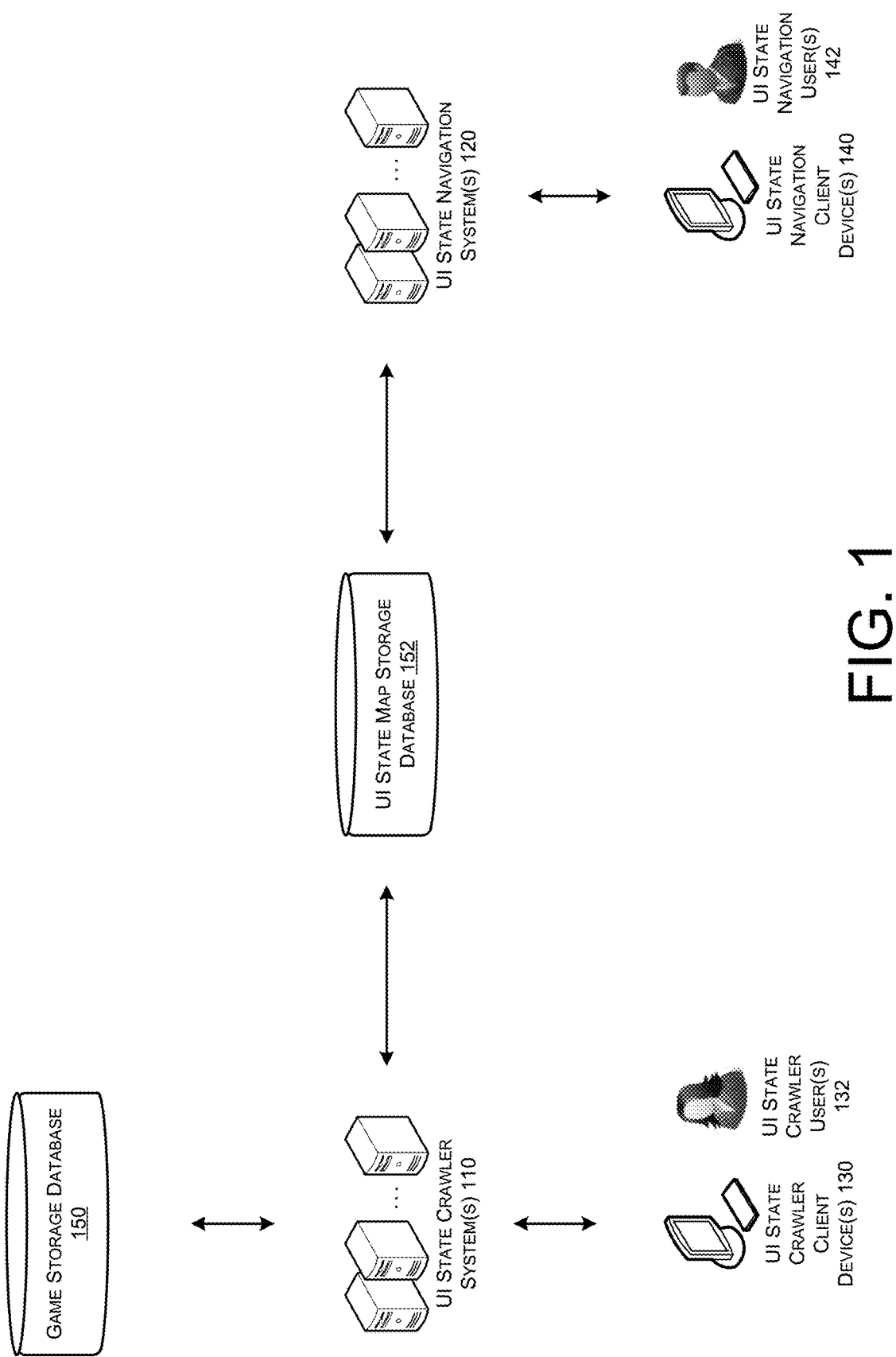
FIG. 1 illustrates a schematic diagram of an example environment with UI state crawler system(s), UI state navigation system(s), UI state crawler client device(s), UI state navigation client device(s), a game storage database and/or a UI state map storage database that may provide for crawling of a video game UI that may identify and map UI states of the video game and for navigation and viewing of the mapped UI states, in accordance with example embodiments of the disclosure.

Example embodiments of this disclosure describe methods, apparatuses, computer-readable media, and system(s) that may provide for user interface (UI) state crawling of a video game UI that may identify and map UI states of the video game and for navigation and viewing of the mapped UI states.

In some examples, a UI of a video game may include a plurality of nodes arranged in a tree or similar structure (hereinafter, "UI state tree"). The UI state crawler system may determine a UI state identifier (ID) for a UI state based on node identifiers (IDs) of the nodes of the UI state tree. For example, during operation, the UI state crawler system may perform an exploration or crawl of the UI of the video game by simulating user inputs to the video game to cause the video game UI state to change. During the exploration or crawl of the UI of the video game, the UI state crawler system may record the UI states found as nodes of a UI state map. The UI state crawler system may also store data associated with the UI states in the nodes and create edges representing navigation paths between the nodes to build the UI state map. In some examples, the data associated with the UI state of a node may include view(s) (e.g., screenshot(s) and/or video(s)) of the video game in the UI state. An edge in the UI state map from a first node to a second node may be associated with an input that may cause the video game UI to transition from a first UI state associated with the first node to a second UI state associated with the second node.

A UI state navigation system may allow for a user to navigate UI states without executing the video game. For example, the UI state navigation system may present the view(s) stored in the node associated with a current UI state, information associated with the current UI state, and/or user inputs that may be input to transition to another UI state. In some examples, the information associated with the current UI state may include the UI state tree for the current UI state.

In some examples, a user of the UI state navigation system may input the same input used in the video game to cause the transition between UI states (e.g., using the same input device as used for the video game). The UI state navigation system may display the transitions between UI states when transitioning to a different node in the UI state map. For example, the edge of the UI state map associated with the transition between states may include image(s) or video(s) of the video game during the transition between UI states which can be displayed when transitioning to a different node in the UI state map.

Additionally or alternatively, the UI state navigation system may further provide a view of the UI state map to the user. The view of the UI state navigation system may indicate the node associated with the current UI state and show navigation paths as directed edges between nodes of the UI state map. In some examples, a user of the UI state navigation system may cause the UI state navigation system to transition between UI states by selecting a node in the view of the UI state map.

In some examples, the UI state navigation system may further allow for a user to select a portion of the information associated with the current UI state or a portion of the view of the current UI state being presented to the user. In response, the UI state navigation system may present additional information to the user. For example, a user may select a node of the UI state tree for the current UI state and the UI state navigation system may modify the view of the current UI state being presented to the user to indicate the portion of the UI associated with the selected node of the UI state tree.

The UI state crawler system may determine a UI state identifier for a UI state based on node IDs of the nodes of the UI state tree. In some examples, the nodes of the UI state tree may be instances of UI elements of the video game. At least a subset of UI elements of the video game may have unique IDs. For example, the UI state crawler system may assign unique IDs to the UI elements. The UI state crawler system may determine a node ID of a node based on the unique ID of the UI element of which the node is an instance. For example, a "box" UI element may have a unique ID. A node of the UI state tree may be an instance of the "box" UI element. In some examples, the node ID of the node may be or be based on the unique ID of the "box" UI element.

Additionally or alternatively, node IDs of at least some nodes may be determined based on additional information such as properties of the node. For example, a node ID of a node may be based on a label of the node or another identifier. In another example, a node ID of a node may change based on a state of the node. For example, a grid node may include multiple selectable button nodes as child nodes. A node ID of the grid node may be determined based on a property of the grid node that indicates which of the selectable buttons is selected.

In some examples, the UI state ID for a UI state may be determined by combining the node IDs of the nodes of the UI state tree. In some examples, the UI state crawler system may determine a UI state ID for a UI state by combining hashes of the node IDs of the nodes of the UI state tree from the bottom up. An example of such a bottom up combining of hashes is discussed below with respect to FIG. 7.

In some examples, the UI state crawler system may determine a UI state family for a UI state when creating a UI state map node for the UI state. In some examples, a UI state family may include nodes whose associated UI state tree matches a set of criteria or a blueprint. For example, a UI state family may include nodes for UI states associated with an in-game menu. Using the grid node above as an example, a UI state family may be associated with the different UI states for a menu screen including the grid. In such a case, different UI states of the UI state family may have a different selectable button in the grid selected.

In some examples, the UI state families may have additional properties which may determine how the UI state crawler system operates when crawling the associated UI states. For example, a UI state family may include a set of allowed inputs or actions that may be taken when the UI is in a UI state of the UI state family. In such an example, when performing a crawl of the UI, the UI state crawler system may determine the next input to the video game based on the current UI state, the allowed set of inputs or actions for the UI state family of the current UI state, and any inputs or actions of the allowed set of inputs or actions that have already been crawled.

Additionally or alternatively, the UI state crawler system may perform the crawl of the UI based on properties or settings of the video game. For example, the UI state crawler system may repeat the crawl of UI state map nodes for different values of a setting. In a particular example, a UI state crawler system may crawl the UI state map for different values of a UI language setting. For example, a UI state ID and UI state map node may be the same for a UI state when different values of the language setting are selected but the UI state crawler system may capture corresponding view(s) and/or information for the UI state for the different languages. The UI state crawler system may further include information for each node of the UI state map as to whether the node and/or each edge to other nodes has been crawled for the different values of the setting (e.g., for each language).

Further, some UI state families may have an additional manual crawl property that may cause the UI state crawler system to change to a manual crawl mode. In a manual crawl mode, the UI state crawler system may allow for manual input from a user to the video game (e.g., instead of automatic input to crawl the UI) while monitoring changes in the UI state and creating nodes for UI states found based on the manual input of the user. An example of a manual crawl family may be a family of UI states associated with gameplay of the video game. This may allow for the identification and tracking of UI states during the unstructured operations of a user during gameplay.

The techniques and systems described herein can improve the functioning of a computing device by allowing for the identification and fixing of bugs, user interface issues and other problems. The UI state crawler system may provide for UI state identifiers that can uniquely identify UI states in a way that may be deterministic, consistent, configurable, game-agnostic, and resilient to changes. For example, the UI state ID determination techniques according to this disclosure may be performed without the presence of any particular asset in the game contents or behavior in the code (thereby being game agnostic). Navigation of the UI based on the UI state map may also remove the need for a user of the UI state navigation system to have the video game executable, thereby increasing security in development and reducing the burden of maintaining an up-to-date version of the video game on the system of a video game tester. These and other improvements to the functioning of the computer are discussed herein.

As described in further detailed below, the systems and methods described herein are presented for exemplary and illustrative purposes; they are not indicative of applicant's product or implementation plans. Moreover, it should be understood that any reference herein to the use of player or user data would be in compliance with privacy policies that respect players' privacy, and in accordance with player privacy settings or preferences.

Certain implementations and embodiments of the disclosure will now be described more fully below with reference to the accompanying figures, in which various aspects are shown. However, the various aspects may be implemented in many different forms and should not be construed as limited to the implementations set forth herein. For example, some embodiments discussed herein illustrate distributed operations of the disclosed systems. However, implementations are not so limited, and the techniques herein may be implemented locally or in a variety of combinations of local and distributed operation. It will be appreciated that the disclosure encompasses variations of the embodiments, as described herein. Like numbers refer to like elements throughout.

FIG. 1 illustrates a schematic diagram of an example environment 100 with UI state crawler system(s) 110, UI state navigation system(s) 120, UI state crawler client device(s) 130, UI state navigation client device(s) 140, a game storage database 150 and/or a UI state map storage database 152 that may provide for crawling of a video game UI that may identify and map UI states of the video game and for navigation and viewing of the mapped UI states, in accordance with example embodiments of the disclosure.

The example environment 100 may include one or more UI state crawler user(s) 132 who may interact with respective UI state crawler client device(s) 130 via respective input device(s) and one or more UI state navigation user(s) 142 who may interact with respective UI state navigation client device(s) 140 via respective input device(s).

During a UI state crawling operation, the UI state crawler system(s) 110 may load a video game from the game storage database 150. For example, a UI state crawler user 132 may interact with a UI state crawler client device 130 to instruct the UI state crawler system(s) 110 to load the video game. The UI state crawler system(s) 110 may then execute the video game in a UI crawl mode and perform a UI state crawl of the UI of the video game.

The UI state crawler system(s) 110 may perform an exploration or crawl of the UI of the video game by simulating user inputs to the video game to cause the video game UI state to change. During the exploration or crawl of the UI of the video game, the UI state crawler system(s) 110 may record the UI states found as nodes of a UI state map. The UI state crawler system(s) 110 may also store data associated with the UI states in the nodes and create edges representing navigation paths between the nodes to build the UI state map. In some examples, the data associated with the UI state of a node may include view(s) (e.g., screenshot(s) or video(s)) of the video game in the UI state. An edge of the UI state map from a first node to a second node may be associated with a user input that causes the video game UI to transition from a first UI state associated with the first node to a second UI state associated with the second node.

As discussed above, a UI of a video game may include a plurality of nodes arranged in a tree or similar hierarchical structure (hereinafter, "UI state tree"). The UI state crawler system may determine a UI state ID for a UI state based on node IDs of the nodes of the UI state tree. To provide additional context for the operation of the UI state crawler system, an example UI state tree and view of a corresponding UI are shown in FIGS. 2 and 3, respectively.

Figure 2:
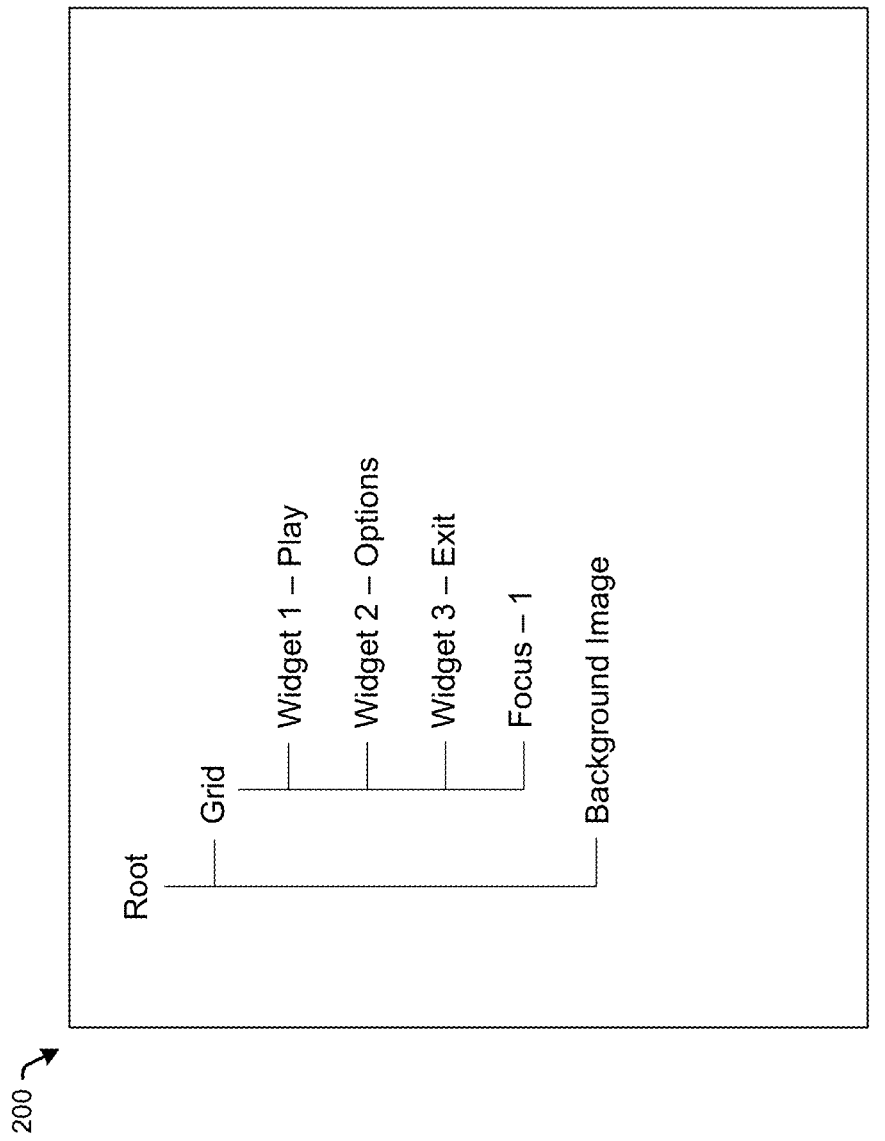
FIG. 2 illustrates an example UI state tree for a UI of a video game, in accordance with example embodiments of the disclosure.

FIG. 2 illustrates an example UI state tree 200 for a UI of a video game, in accordance with example embodiments of the disclosure. The example UI state tree 200 is simplified for ease of illustration and understanding. One of ordinary skill in the art would understand based on this disclosure how to apply the systems and techniques discussed herein to more complicated UI state trees.

As shown, the UI state tree 200 includes a root node with two child nodes. In particular, the child nodes of the root node are a grid node and a background image node. The grid node includes four child nodes, namely three selectable widgets and a focus node that represents which of the selectable widgets is selected or focused. The three selectable widgets are menu options to (1) play the game, (2) show an options menu, and (3) exit the game. As shown, the index value of the focus node indicates the first widget, the "Play" widget, is the current focus. Each of the nodes of the UI state tree 200 may have an associated node ID that may be used in determining a UI state ID of the UI state corresponding to the UI state tree 200.

Figure 3:
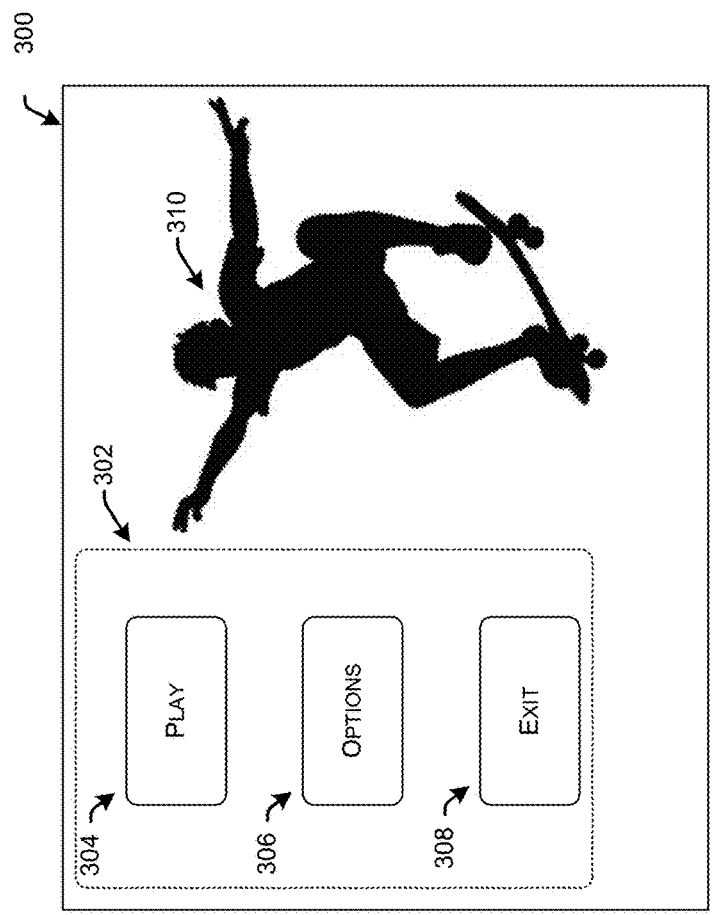
FIG. 3 illustrates an example view of a UI of a video game that may correspond to the UI state tree of FIG. 2, in accordance with example embodiments of the disclosure.

FIG. 3 illustrates an example view of a UI 300 of a video game that may correspond to the UI state tree 200 of FIG. 2, in accordance with example embodiments of the disclosure. As shown, the UI 300 includes the grid widget 302 that includes three selectable widgets including a "Play" widget 304 that is currently focused or selected, an "Options" widget 306, an "Exit" widget 308 and a background image 310.

As mentioned above, the UI state crawler system(s) 110 may determine a UI state ID for a UI state based on node IDs of the nodes of the UI state tree. For example, the UI state crawler system(s) 110 may determine a UI state ID upon initiation of the crawling operation and/or after a UI state change caused by automatic input or manual input to the video game. The determination of node IDs may be based on a variety of information.

In some examples, the nodes of the UI state tree may be instances of UI elements of the video game. For example, in the UI state tree 200, the grid node is an instance of the "grid" UI element, the Play, Options and Exit widget nodes included in the grid are instances of a selectable widget UI element, the focus node is an instance of a focus UI element, and the background image node is an instance of an image UI element.

At least a subset of UI elements of a video game may have unique identifiers (IDs). In some examples, the UI state crawler system(s) 110 may assign unique identifiers (IDs) to the UI elements. In the illustrated example of FIG. 2, a first unique ID may be assigned to the "grid" UI element, a second unique ID may be assigned to the selectable widget UI element, and a third unique ID may be assigned to the focus UI element and a fourth unique ID may be assigned to the image UI element.

The UI state crawler system(s) 110 may determine a node ID of a node to be or based on the unique ID of the UI element of which the node is an instance. In the illustrated example of FIG. 2, the UI state crawler system(s) 110 may determine the node ID of the grid node to be or based on the unique ID of the "grid" UI element, the node IDs of the Play, Options and Exit widget nodes to be or based on the unique ID of the selectable widget UI element, the node ID of the focus node to be or based on the unique ID of the focus UI element and the node ID of the background image node to be or based on the unique ID of the image UI element.

In some examples, a UI tree node that is an instance of a UI element without a unique ID may be assigned no node ID, be given a node ID that will not impact the determination of the UI state ID, or be given a node ID determined based on other information.

In some examples, the UI state crawler system(s) 110 may determine a node ID of a UI tree node based on additional information such as propert(ies) of the UI tree node. For example, the UI state crawler system(s) 110 may determine a node ID of a node based on a label of the node, a value of the node, or other data associated with the node. In some examples, a node ID of a node may change based on a state of the node. For example, the node ID of the focus node may be based on and change for different selection values. In such an example, the UI state ID determined may change when different selectable widget nodes of grid are focused resulting in the corresponding UI state map nodes for the different values. While the focus of the grid node in FIG. 2 is illustrated as a child node of the grid node, in other examples, the focus or selection of the buttons included in the grid may be a property of the grid node. In such an example, the UI state crawler system(s) 110 may determine the node ID of the grid node based on a property of the grid node that indicates which of the selectable buttons 304-308 is selected.

Further, the UI state crawler system(s) 110 may determine the node ID of a UI tree node based on a combination of the unique ID of the UI element of which the node is an instance and/or additional information of the node. For example, the UI state crawler system(s) 110 may determine the node ID of the focus node of FIG. 2 based on a unique ID of the "focus" UI element and the value of the focus node that indicates which of the selectable buttons 304-308 is selected.

In some examples, the UI state crawler system(s) 110 may determine the UI state ID for a UI state by combining the node IDs of the nodes of the UI state tree. In some examples, the UI state crawler system may determine a UI state ID for a UI state by combining node state IDs of the nodes of the UI state tree from the bottom up. To determine a node state ID for a node without child nodes, the UI state crawler system(s) 110 may perform a hash on the node ID of the node to determine the corresponding node state ID. In the example of FIG. 2, the UI state crawler system(s) 110 may determine corresponding node state IDs for the three selectable button widgets (e.g., "play," "options," and "exit") and the focus node by hashing the respective node ID of the node. Similarly, the UI state crawler system(s) 110 may perform a hash on the node ID of the background image node to determine a node state ID of the background image node. To determine the node state ID of a node with child nodes, the UI state crawler system(s) 110 may perform a hash on the node ID of the parent node and perform a combining of the hash of the parent node ID with the node state IDs of the child nodes of the parent node. In the example of FIG. 2, the UI state crawler system(s) 110 may determine a node state ID of the grid node by combining the hash of the node ID of the grid node with the node state IDs of the four child nodes of the grid node. Finally, the UI state crawler system(s) 110 may determine a node state ID of the root node by combining a hash of the node ID of the root node with the node state IDs of the grid node and background image node. The UI state crawler system(s) 110 may utilize the resulting node state ID of the root node as the UI state ID of the UI state (e.g., for the UI state illustrated in FIGS. 2 and 3). Additional detail of a process for determining a UI state ID based on node IDs of a UI state tree are provided below with respect to FIG. 7.

In some examples, the UI state crawler system(s) 110 may determine a UI state family when creating a node for a new UI state. In some examples, a UI state family may include nodes whose associated UI state tree matches a set of criteria or a blueprint. In the example of FIGS. 2 and 3, a UI state family may include nodes for UI states associated with the in-game menu illustrated in FIG. 3 (e.g., UI states including a grid node with three selectable widget nodes). The UI state family criteria may match a subset of the UI state tree nodes (e.g., match with UI state trees that do not include a background image node or which may include additional node other than fewer or additional selectable options in the grid). Returning to the example of FIGS. 2 and 3, the UI state family may be associated with the different UI states for the illustrated menu screen with different selectable widgets selected.

In some examples, a UI state family may have additional properties which may determine how the UI state crawler system(s) 110 may operate when crawling the UI states of the UI state family. For example, a UI state family may include a set of allowed inputs or actions that may be taken when the UI is in a UI state of the UI state family. In such an example, when performing a crawl of the UI, the UI state crawler system(s) 110 may determine a next input to the video game based on the current UI state, the allowed set of inputs or actions for the UI state family of the current UI state, and any inputs or actions of the allowed set of inputs or actions that have already been crawled. In some examples, utilizing an allowed set of inputs or actions for UI states in a UI family may provide for improved efficiency and/or reduced processing required to perform the operations of the UI state crawler system(s) 110.

Figure 4:
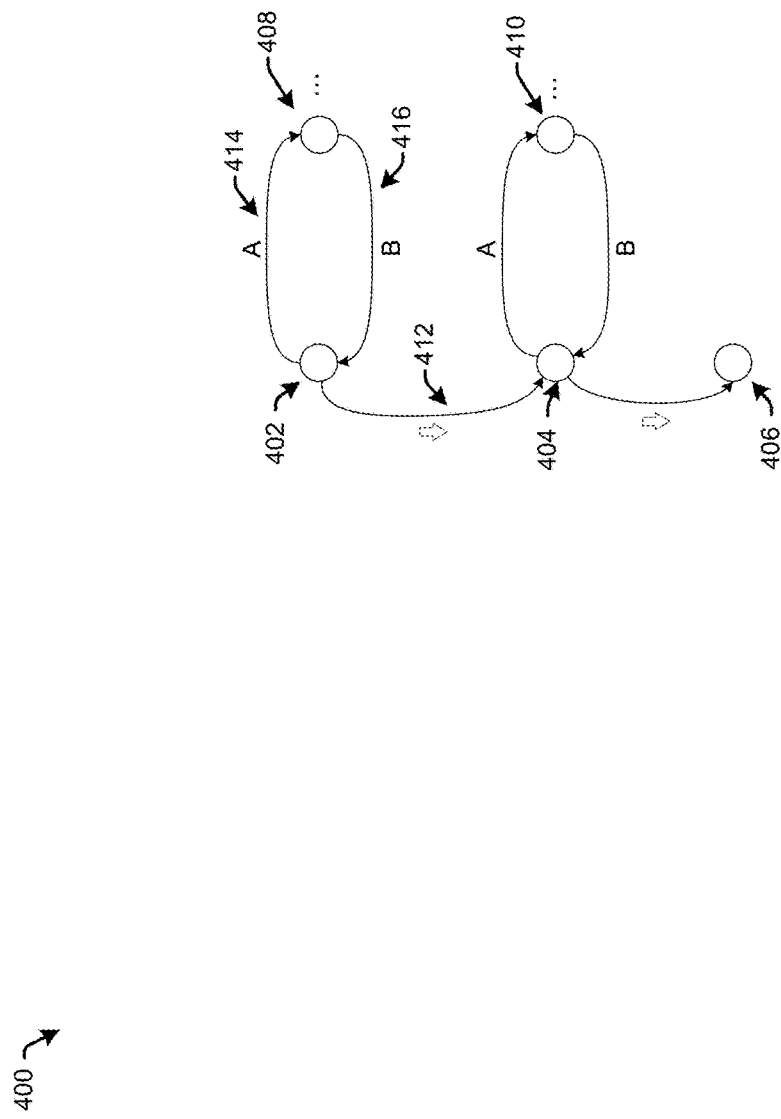
FIG. 4 illustrates an example UI state map for a UI of a video game, in accordance with example embodiments of the disclosure.

FIG. 4 illustrates an example UI state map 400 for a UI of a video game, in accordance with example embodiments of the disclosure. More particularly, the UI state map 400 may correspond to at least a portion of a UI state map generated by the UI state crawler system(s) 110 for the video game associated with the UI state tree 200 of FIG. 2 and the UI view 300 of FIG. 3.

The UI state map 400 includes UI state map nodes (e.g., 402-410) and edges (e.g., 412-416) representing navigation paths between the UI state map nodes. Individual edges are associated with a user input that causes the video game UI to transition from a first UI state associated with a first node to a second UI state associated with a second node.

The UI state tree 400 includes nodes 402, 404, and 406 which may correspond to UI states of the UI shown in FIGS. 2 and 3 with different menu options selected (e.g., with different values of the focus node). More particularly, node 402 may represent the UI state shown in FIGS. 2 and 3 with the "Play" selectable widget selected, node 404 may represent a UI state of the UI with the "Options" selectable widget selected, and node 406 may represent a UI state of the UI with the "Exit" selectable widget selected. The UI state map includes edges between the nodes 402-406 associated with the down arrow (e.g., edge 412). Node 408 may represent a game play options menu that may be reached using the "A" input when in the UI state corresponding to node 402 (e.g., via edge 414) and node 410 may represent a game options menu that may be reached using the "A" input when in the UI state corresponding to node 404.

In the illustrated example, the UI state family of nodes 402-406 may include allowed actions of the down arrow and the "A" input (e.g., the "B" input may be disallowed). On the other hand, the UI state families of nodes 408 and 410 may include allowed actions that include the "B" input (e.g., in addition to other allowed inputs) which may allow the UI to return to the menu shown in the UI states of nodes 402-406. For example, the edge 416 corresponds to a "B" input while the UI is in the UI state of node 408 and which returns the UI to the UI state of node 402.

In some examples, the UI state crawler system(s) 110 may perform the crawl of the UI based on properties or settings of the video game. For example, the UI state crawler system(s) 110 may repeat the crawl of the UI state map for different values of a UI language setting. In a particular example, the UI state ID and UI state map node may be the same for a UI state in different language (e.g., for different values of the UI language setting). In such an example, the UI state crawler system(s) 110 may capture, for the different languages, corresponding view(s) and/or information for the UI state. The UI state crawler system(s) 110 may further include information for each node of the UI state map as to whether the node and/or each edge to other nodes has been crawled for the different values of the setting (e.g., for each language). This may allow the UI state crawler system(s) 110 to crawl the UI of a video game for a first value of the setting (e.g., for a first language) and then add additional views and/or other information to the nodes of the UI state map by crawling the UI of the video game for other values of the setting (e.g., for additional languages).

Further, some UI state families may have a manual crawl property that may cause the UI state crawler system(s) 110 to change to a manual crawl mode. In a manual crawl mode, the UI state crawler system(s) 110 may allow for manual input from a user to the video game (e.g., instead of automatic input to crawl the UI) while monitoring changes in the UI state and creating nodes for UI states found based on the manual input of the user. In an example, a manual crawl family may be a family of UI states associated with gameplay of the video game. This may allow for the identification and tracking of UI states during the unstructured operations of a user during gameplay. For example, after crawling into a manual crawl UI state in a video game (e.g., into gameplay of the video game), the UI state crawler system(s) 110 may shift to a manual crawl mode. A UI state crawler user 132 may input gameplay controls to a UI state crawler client device 130 to control the gameplay of the video game. The UI state crawler system(s) 110 may monitor changes to the UI state and create additional nodes in the UI state map and edges therebetween while the UI state crawler user 132 controls the gameplay. The UI state crawler system(s) 110 may also determine when the video game transitions to a UI state that is not in a manual crawl UI state family. In response, the UI state crawler system(s) 110 may resume its automatic crawling of the UI.

The UI state crawler system(s) 110 may store the UI state map in the UI state map storage database 152. For example, the UI state crawler system(s) 110 may store the UI state map in the UI state map storage database 152 for use by the UI state navigation system(s) 120.

During UI state navigation operations, the UI state navigation system(s) 120 may load a UI state map of a video game from the UI state map storage database 152. For example, a UI state navigation user 142 may interact with a UI state navigation client device 140 to instruct the UI state navigation system(s) 120 to load a UI state map of a video game to allow the UI state navigation user 142 to navigate the UI states of the UI of the video game.

In some examples, the UI state navigation system(s) 120 may allow for a UI state navigation user 142 to navigate the UI states without executing the video game. For example, the UI state navigation system(s) 120 may present the view(s) stored in the node associated with a current UI state, information associated with the current UI state, and/or allowable user inputs that may be input to transition to another UI state. In some examples, the information associated with the current UI state may include the UI state tree for the current UI state.

In some examples, a UI state navigation user 142 of the UI state navigation system(s) 120 may input the same input used in the video game to cause a transition between UI states (e.g., using the same input device as used for the video game). The UI state navigation system(s) 120 may display the transitions between UI states when transitioning to a different node in the UI state map. Additionally or alternatively, the UI state navigation system(s) 120 may further provide a view of the UI state map to the UI state navigation user 142. The view of the UI state map may indicate the node associated with the current UI state and show navigation paths as directed edges between nodes of the UI state map. In some examples, a UI state navigation user 142 may cause the UI state navigation system(s) 120 to transition between UI states by selecting a node in the view of the UI state map.

Figure 5:
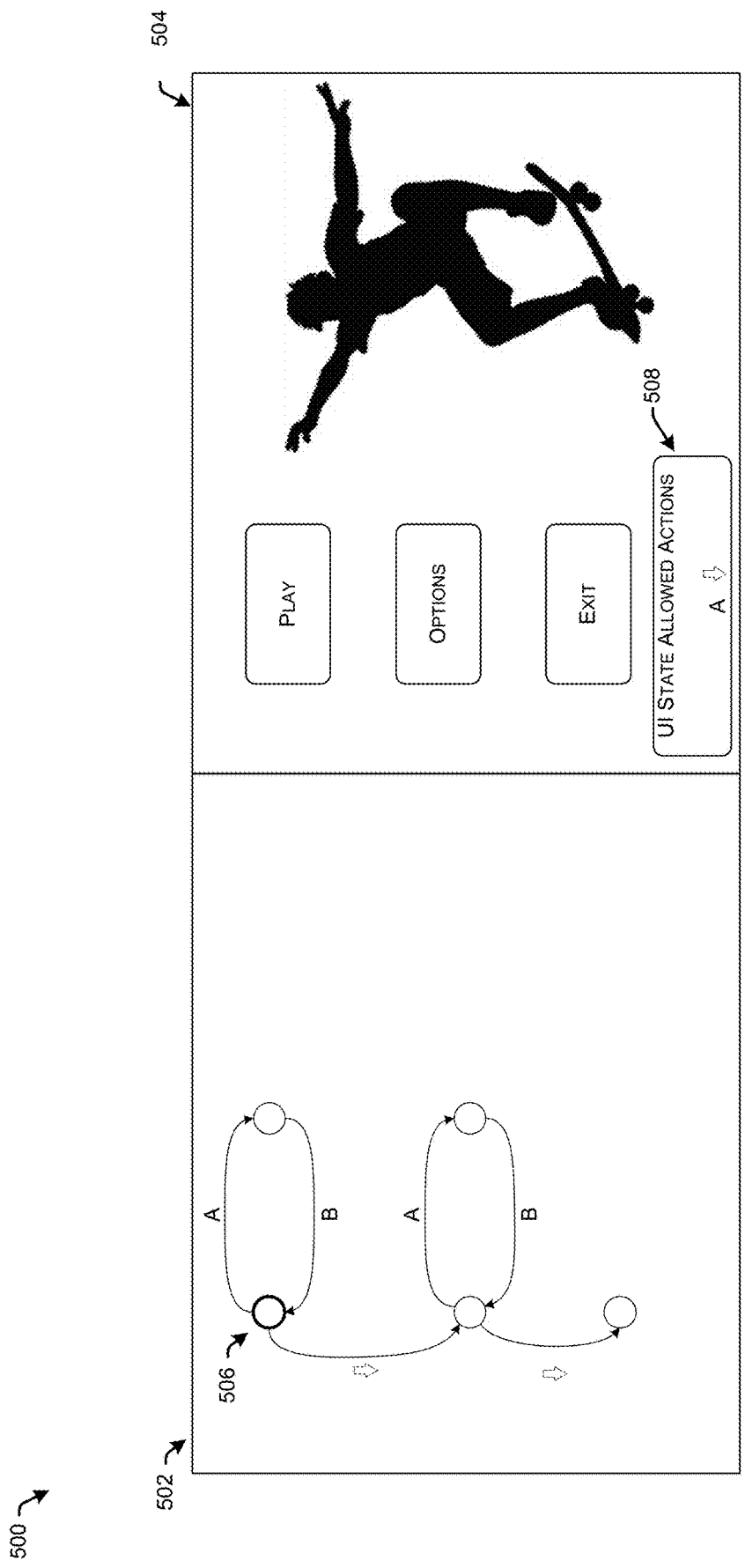
FIG. 5 illustrates an example view that may be presented to a UI state navigation user by the UI state navigation system(s), in accordance with example embodiments of the disclosure.

FIG. 5 illustrates an example view 500 that may be presented to a UI state navigation user by the UI state navigation system(s), in accordance with example embodiments of the disclosure. In the example of FIG. 1, the example view 500 may be presented to a UI state navigation user 142 by the UI state navigation system(s) 120 via a UI state navigation client device 140. More particularly, the view 500 may correspond to a view presented to a UI state navigation user by the UI state navigation system(s) 120 when navigating to the UI state map node 402 of FIG. 4.

As illustrated, the view 500 presented by the UI state navigation system(s) 120 includes a view 502 of the UI state map and a view 504 of the UI for the current state of the UI. In addition, the view 502 includes an indication 506 of the current node in the UI state map and the view 504 also includes a set of allowable user inputs 508 that may be input to transition to another UI state from the current UI state.

In some examples, the UI state navigation system(s) 120 may further allow for a UI state navigation user 142 to select a portion of the information associated with the current UI state or a portion of the view of the current UI state being presented to the UI state navigation user 142. In response, the UI state navigation system(s) 120 may present additional information to the user. For example, a UI state navigation user 142 may select a node of the UI state tree for the current UI state and the UI state navigation system(s) 120 may modify the view of the current UI state being presented to the UI state navigation user 142 to indicate the portion of the UI associated with the selected node of the UI state tree.

Figure 6:
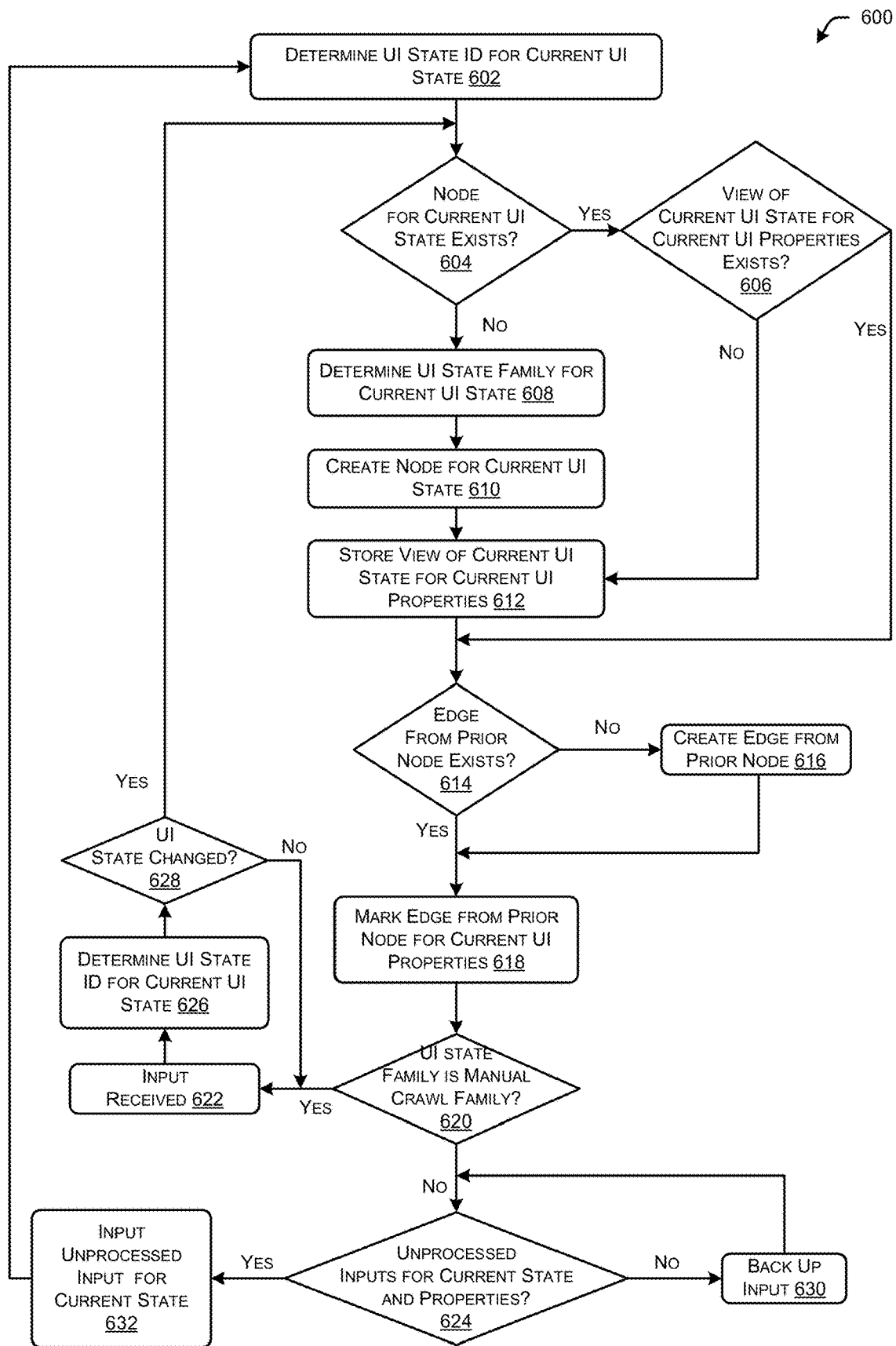
FIG. 6 illustrates a flow diagram of an example method that may provide for the crawling of a video game UI that may identify and map UI states of the video game, in accordance with example embodiments of the disclosure.

FIG. 6 illustrates a flow diagram of an example method 600 that may provide for the crawling of a video game UI that may identify and map UI states of the video game, in accordance with example embodiments of the disclosure. The method 600 may be performed by the UI state crawler system(s) 110 of the environment 100. More particularly, the method 600 may relate to the operations of a UI state crawler system(s) 110 to crawl the UI of a video game to create a UI state map. Method 600 may be performed, for example, based on the details discussed above with regard to FIG. 1-5.

At block 602, the UI state crawler system(s) 110 may determine a UI state ID for a current UI state of the video game. At block 604, the UI state crawler system(s) 110 may determine, based on the UI state ID, whether a node in the UI state map exists for the current UI state. If so, the process may continue to block 606. Otherwise, the process may continue to block 608.

At block 606, the UI state crawler system(s) 110 may determine whether a view and/or other data has been stored in the node associated with the UI state ID for the current UI properties or settings. As discussed above, the UI state crawler system(s) 110 may crawl the UI of the video game multiple times to capture views and/or additional information for different UI properties or settings, such as different languages. If view(s) and/or other data have been stored for the current UI state map node with the current UI properties or settings, the process may continue to block 614. Otherwise, the process may continue to block 612.

Returning to block 608 (e.g., reached via "No" from block 604), the UI state crawler system(s) 110 may determine a UI state family for the current UI state. The UI state crawler system(s) 110 may then create a node in the UI state map for the current UI state at block 610. The newly created node may have the UI state ID determined at block 602 and include information associated with the current UI state (e.g., the UI state tree, a UI state family identifier, etc.). At block 612, the UI state crawler system(s) 110 may store view(s) associated with the current UI state and/or the current UI properties.

At block 614, the UI state crawler system(s) 110 may determine whether an edge from a node for a previous UI state to the node for the current UI state exists. If not, the process may continue to block 616. Otherwise, the process may continue to block 618.

At block 616, the UI state crawler system(s) 110 may create an edge from the node for the previous UI state to the node for the current UI state. The created edge may include the input that caused the transition from previous UI state to the current UI state. At block 618, the edge may be marked for the current UI properties such that the input that caused the transition from the previous UI state to the current UI state is marked as processed for the node for the previous UI state for the current properties of the UI. Additionally or alternatively, a list of inputs that have been processed for the previous UI state in the node associated with the previous UI state may be updated to mark the input that caused the transition as processed for the current UI properties.

At block 620, the UI state crawler system(s) 110 may determine whether the UI state family of node for the current UI state is a manual crawl family. If so, the process may continue to block 622. Otherwise, the process may continue to block 624.

At block 622, the UI state crawler system(s) 110 may receive a manual input, for example, from a UI state crawler user 132 via a UI state crawler client device 130 and the manual input may be passed to the video game. At block 626, the UI state crawler system(s) 110 may determine a UI state ID for the current UI state of the video game (e.g., after the manual input). At block 628, the UI state crawler system(s) 110 may determine whether the UI state has changed, for example, based on whether the UI state ID after the manual input is different from the UI state ID prior to the manual input. If not, the process may return to block 622 for another manual input. Otherwise, the process may return to block 604 to process the new UI state.

Returning to block 624 (e.g., reached via "No" from block 620), the UI state crawler system(s) 110 may determine whether the node for the current UI state has unprocessed inputs for the current UI properties. If not, the process may continue to block 630. Otherwise, the process may continue to block 632.

At block 630, the UI state crawler system(s) 110 may attempt to back up to the node for the prior UI state. Iterations of blocks 624 and 630 may repeat until a prior node with unprocessed inputs for the current UI properties is reached and the process continues to block 632 or the UI state crawler system(s) 110 cannot back up further. If the UI state crawler system(s) 110 cannot back up further, the UI state crawler system(s) 110 may perform a search of nodes of the UI state map for a node that has unprocessed inputs for the current UI properties. If a node with unprocessed inputs for the current UI properties is found, the process may continue to block 632. Otherwise, the process may end or additional processing may begin for the UI of the video game with different UI propert(ies) and/or setting(s).

Returning to block 632 (e.g., reached via "Yes" from block 624), the UI state crawler system(s) 110 may input to the video game an unprocessed input for the current UI state and/or current UI properties. The process may then return to block 602 for the UI state after the input to the video game.

Figure 7:
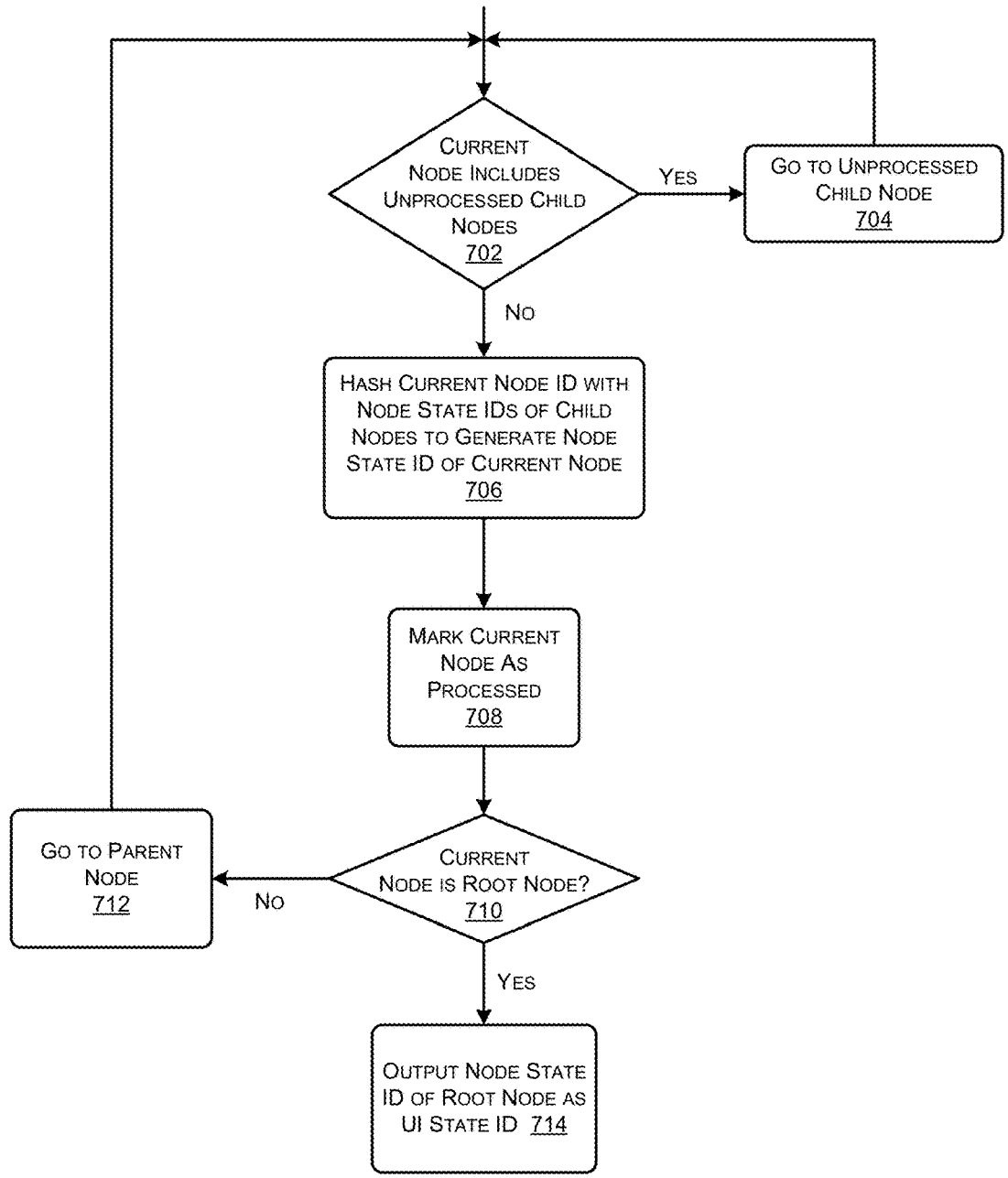
FIG. 7 illustrates a flow diagram of an example method to determine a UI state ID for a UI state tree, in accordance with example embodiments of the disclosure.

FIG. 7 illustrates a flow diagram of an example method 700 to determine a UI state ID for a UI state tree, in accordance with example embodiments of the disclosure. The method 700 may be performed by the UI state crawler system(s) 110 of the environment 100. Method 700 may be performed, for example, based on the details discussed above with regard to FIGS. 1-6.

At block 702, the UI state crawler system(s) 110 may determine whether a current node of the UI state tree includes an unprocessed child node. If so, the process may continue to block 704. Otherwise, the process may continue to block 706. In some examples, the method 700 may be initiated with a root node of the UI state tree selected as the current node.

At block 704, the UI state crawler system(s) 110 may change the current node to an unprocessed child node determined at block 702. The process may then return to block 702 with the unprocessed child node as the current node.

Returning to block 706 (e.g., reached via "No" from block 702), the UI state crawler system(s) 110 may determine a node state ID of the current node by hashing a node ID of the current node and combining the hash with the node state ID(s) of any child nodes of the current node. The UI state crawler system(s) 110 may mark the current node as processed at block 708.

At block 710, the UI state crawler system(s) 110 may determine whether the current node is the root node of the UI state tree. If not, the process may continue to block 712. Otherwise, the process may continue to block 714.

At block 712, the UI state crawler system(s) 110 may change the current node to the parent of the current node. The process may then return to block 702 with the parent node as the current node.

Returning to block 714 (e.g., reached via "Yes" from block 710), the UI state crawler system(s) 110 may output the node state ID of the root node as the UI state ID for the current UI state.

Figure 8:
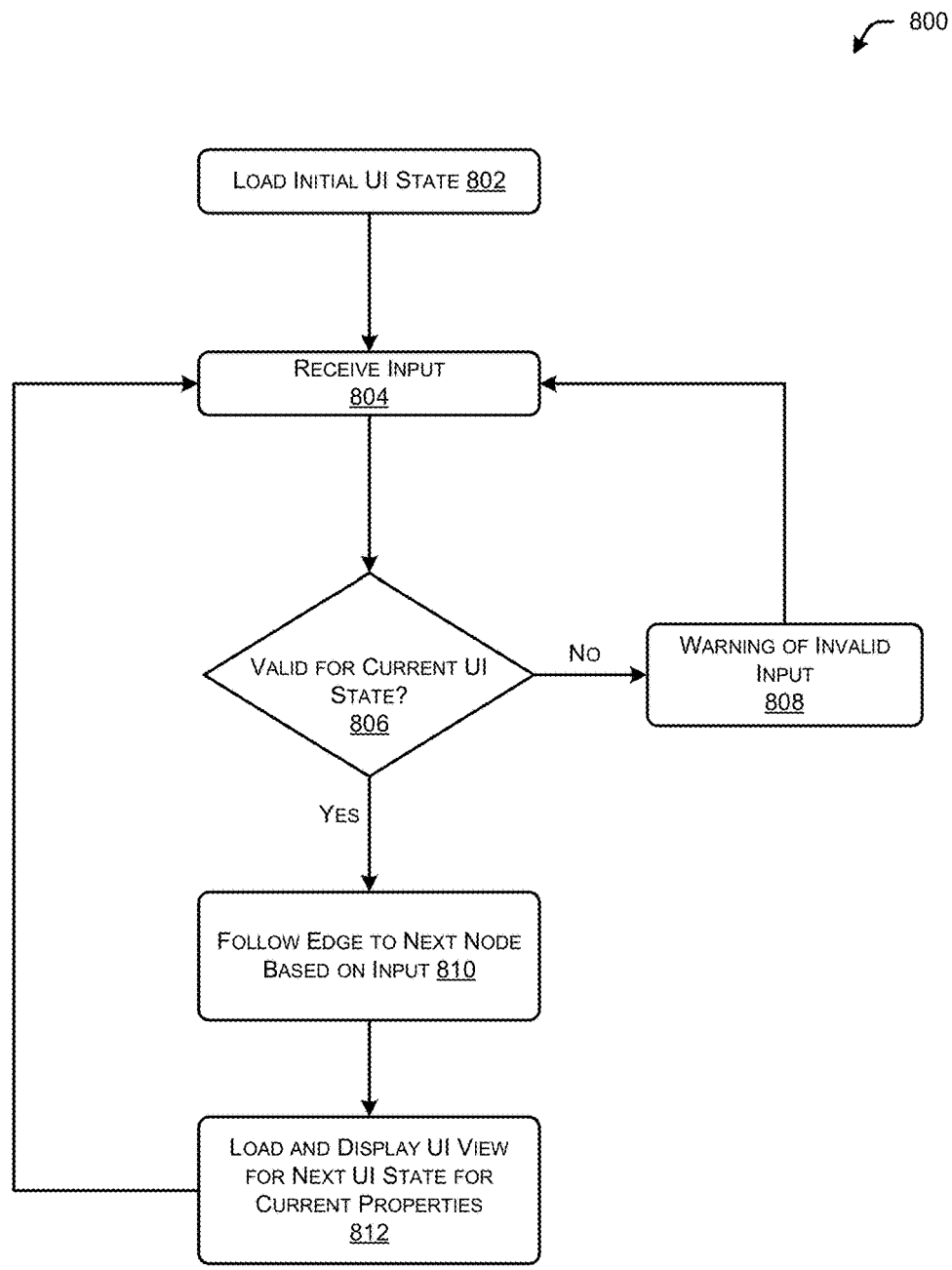
FIG. 8 illustrates a flow diagram of an example method to navigate a UI state map, in accordance with example embodiments of the disclosure.

FIG. 8 illustrates a flow diagram of an example method 800 to navigate a UI state map, in accordance with example embodiments of the disclosure. The method 800 may be performed by the UI state navigation system(s) 120 of the environment 100. Method 800 may be performed, for example, based on the details discussed above with regard to FIGS. 1-7.

At block 802, the UI state navigation system(s) 120 may load an initial UI state from the UI state map. At block 804, the UI state navigation system(s) 120 may receive an input, for example, from a UI state navigation user 142 via a UI state navigation client device 140.

At block 806, the UI state navigation system(s) 120 may determine whether the received input is a valid or allowed input for the current UI state. If not, the process may continue to block 808. Otherwise, the process may continue to block 810.

At block 808, the UI state navigation system(s) 120 may output a warning of the invalid input and return to block 804 for additional input.

Returning to block 810 (e.g., reached via "Yes" from block 806), the UI state navigation system(s) 120 may follow an edge associated with the received input to a next node in the UI state map. The UI state navigation system(s) 120 may load and display the UI view for the UI state of the next node and for the current UI properties at block 812. The UI state navigation system(s) 120 may receive additional inputs for the current view of the UI (e.g., to display information relating to the current UI state). The process may return to block 804 when the UI state navigation system(s) 120 receives an input to change the UI state.

It should be noted that some of the operations of methods 600-800 may be performed out of the order presented (e.g., block 604 could be performed by block 602 in some embodiments), with additional elements, and/or without some elements. Some of the operations of methods 600-800 may further take place substantially concurrently and, therefore, may conclude in an order different from the order of operations shown above.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and are believed to meet or exceed government and legal requirements of respective jurisdictions. To the extent that such an implementation or use of these systems and methods enables or requires processing of user personal information, such processing is performed (i)

as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

Figure 9:
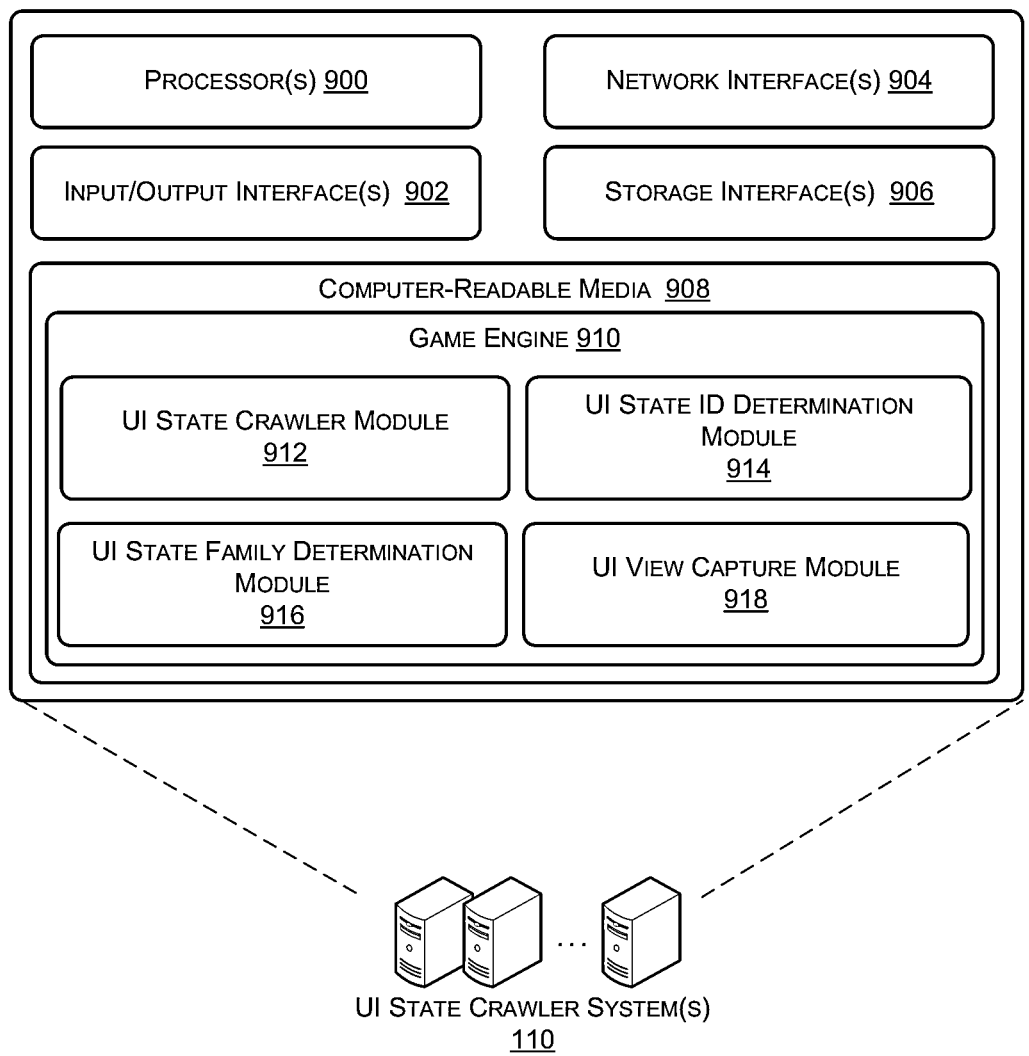
FIG. 9 illustrates a block diagram of example UI state crawler system(s) that may provide for crawling of a video game UI that may identify and map UI states of the video game, in accordance with examples of the disclosure.

FIG. 9 illustrates a block diagram of example UI state crawler system(s) 110 that may provide for crawling of a video game UI that may identify and map UI states of the video game, in accordance with examples of the disclosure. The UI state crawler system(s) 110 may include one or more processor(s) 900, one or more input/output (I/O) interface(s) 902, one or more network interface(s) 904, one or more storage interface(s) 906, and computer-readable media 908.

In some implementations, the processor(s) 900 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), etc. Additionally, each of the processor(s) 900 may possess its own local memory, which also may store program modules, program data, and/or one or more operating system(s). The one or more processor(s) 900 may include one or more cores.

The one or more input/output (I/O) interface(s) 902 may enable the UI state crawler system(s) 110 to detect interaction with a user and/or other system(s), such as one or more UI state crawler client device(s) 130. The I/O interface(s) 902 may include a combination of hardware, software, and/or firmware and may include software drivers for enabling the operation of any variety of I/O device(s) integrated on the UI state crawler system(s) 110 or with which the UI state crawler system(s) 110 interacts, such as displays, microphones, speakers, cameras, switches, and any other variety of sensors, or the like.

The network interface(s) 904 may enable UI state crawler system(s) 110 to communicate via the one or more network(s). The network interface(s) 904 may include a combination of hardware, software, and/or firmware and may include software drivers for enabling any variety of protocol-based communications, and any variety of wireline and/or wireless ports/antennas. For example, the network interface(s) 904 may comprise one or more of a cellular radio, a wireless (e.g., IEEE 802.1x-based) interface, a Bluetooth® interface, and the like. In some embodiments, the network interface(s) 904 may include radio frequency (RF) circuitry that allows the UI state crawler system(s) 110 to transition between various standards. The network interface(s) 904 may further enable the UI state crawler system(s) 110 to communicate over circuit-switch domains and/or packet-switch domains.

The storage interface(s) 906 may enable the processor(s) 900 to interface and exchange data with the computer-readable medium 908, as well as any storage device(s) external to the UI state crawler system(s) 110.

The computer-readable media 908 may include volatile and/or nonvolatile memory, removable and non-removable media implemented in any method or technology for storage of information, such as computer-readable instructions, data structures, program modules, or other data. Such memory includes, but is not limited to, random access memory (RAM), read-only memory (ROM), electrically erasable programmable read-only memory (EEPROM), flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device. The computer-readable media 908 may be implemented as computer-readable storage media (CRSM), which may be any available physical media accessible by the processor(s) 900 to execute instructions stored on the computer readable media 908. In one basic implementation, CRSM may include RAM and Flash memory. In other implementations, CRSM may include, but is not limited to, ROM, EEPROM, or any other tangible medium which can be used to store the desired information and which can be accessed by the processor(s) 900. The computer-readable media 908 may have an operating system (OS) and/or a variety of suitable applications stored thereon. The OS, when executed by the processor(s) 900 may enable management of hardware and/or software resources of the UI state crawler system(s) 110.

Several functional blocks having instruction, data stores, and so forth may be stored within the computer-readable media 908 and configured to execute on the processor(s) 900. The computer readable media 908 may have stored thereon a game engine 910 including a UI state crawler module 912, a UI state ID determination module 914, a UI state family determination module 916, and a UI view capture module 918. It will be appreciated that each of the functional blocks 910-918 may have instructions stored therein that, when executed by the processor(s) 900, may enable various functions pertaining to the operations of UI state crawler system(s) 110.

For example, the UI state crawler module 912 may operate to provide for crawling of a video game UI that may identify and map UI states of the video game as discussed above with respect to FIGS. 1-6. The UI state ID determination module 914 may operate to determine a UI state ID for a UI state tree as discussed above with respect to FIGS. 1-7. The UI state family determination module 916 may operate to determine a UI state family of a UI state as discussed above with respect to FIGS. 1-6. The UI view capture module 918 may operate to capture and store views and/or other information above UI states as discussed above with respect to FIGS. 1-6.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of system(s), methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system, comprising:
one or more processors; and
one or more computer-readable media storing computer-executable instructions that, when executed by the one or more processors, cause the one or more processors to perform operations comprising:
determining a user interface (UI) state identifier (ID) for a UI state of a UI of a video game based at least in part on a plurality of node IDs corresponding to a plurality of nodes of a hierarchical structure of the UI;
determining a UI state map does not include a UI state map node corresponding to the UI state ID; and
in response to the determining the UI state map does not include the UI state map node corresponding to the UI state ID, generating an updated UI state map including the UI state map node corresponding to the UI state ID.

2. The system of claim 1, wherein the operations further comprise:
determining another UI state ID for another UI state of the video game;
determining, based on the other UI state ID, that the updated UI state map includes another UI state map node corresponding to the other UI state ID;
determining the updated UI state map does not include an edge from the UI state map node to the other UI state map node for an input associated with a transition from the UI state to the other UI state; and
in response to the determining the updated UI state map does not include the edge from the UI state map node to the other UI state map node for the input associated with the transition from the UI state to the other UI state, generating another updated UI state map including the edge from the UI state map node to the other UI state map node for the input associated with the transition from the UI state to the other UI state.

3. The system of claim 1, wherein:
a node of the plurality of nodes of the hierarchical structure of the UI is an instance of a UI element; and
a node ID of the node of the plurality of nodes of the hierarchical structure of the UI is based on a unique element ID of the UI element.

4. The system of claim 1, wherein a node ID of a node of the plurality of nodes of the hierarchical structure of the UI is based on a value or property associated with the node.

5. The system of claim 1, wherein determining the UI state ID for the UI state based at least in part on the plurality of node IDs corresponding to the plurality of nodes of the hierarchical structure of the UI is based at least in part on a hierarchical relationship of a first node of the hierarchical structure to a second node of the hierarchical structure.

6. The system of claim 1, wherein the operations further comprise:
determining the plurality of nodes of the hierarchical structure of the UI for the UI state match a criteria associated with a UI state family;
determining a next input based on a set of allowed inputs for the UI state family; and
inputting the next input to the video game.

7. The system of claim 1, wherein the UI state map node includes one or more images of the UI of the video game for the UI state.

8. The system of claim 1, wherein another UI map state node of the updated UI state map includes at least a first image of another UI state for a first setting of a UI property and a second image of the other UI state for a second setting of the UI property.

9. A computer-implemented method comprising:
determining a user interface (UI) state identifier (ID) for a UI state of a UI of a video game based at least in part on a plurality of node IDs corresponding to a plurality of nodes of a hierarchical structure of the UI;

determining a UI state map does not include a UI state map node corresponding to the UI state ID; and in response to the determining the UI state map does not include the UI state map node corresponding to the UI state ID, generating an updated UI state map including the UI state map node corresponding to the UI state ID.

10. The computer-implemented method of claim 9, further comprising:

determining another UI state ID for another UI state of the video game;

determining, based on the other UI state ID, that the updated UI state map includes another UI state map node corresponding to the other UI state ID;

determining the updated UI state map does not include an edge from the UI state map node to the other UI state map node for an input associated with a transition from the UI state to the other UI state; and in response to the determining the updated UI state map does not include the edge from the UI state map node to the other UI state map node for the input associated with the transition from the UI state to the other UI state, generating another updated UI state map including the edge from the UI state map node to the other UI state map node for the input associated with the transition from the UI state to the other UI state.

11. The computer-implemented method of claim 9, wherein:

a node of the plurality of nodes of the hierarchical structure of the UI is an instance of a UI element; and a node ID of the node of the plurality of nodes of the hierarchical structure of the UI is based on a unique element ID of the UI element.

12. The computer-implemented method of claim 9, wherein a node ID of a node of the plurality of nodes of the hierarchical structure of the UI is based on a value or property associated with the node.

13. The computer-implemented method of claim 9, wherein determining the UI state ID for the UI state based at least in part on the plurality of node IDs corresponding to the plurality of nodes of the hierarchical structure of the UI is based at least in part on a hierarchical relationship of a first node of the hierarchical structure to a second node of the hierarchical structure.

14. The computer-implemented method of claim 9, further comprising:

determining the plurality of nodes of the hierarchical structure of the UI for the UI state match a criteria associated with a UI state family;

determining a next input based on a set of allowed inputs for the UI state family; and inputting the next input to the video game.

15. The computer-implemented method of claim 9, wherein another UI map state node of the updated UI state map includes at least a first image of another UI state for a first setting of a UI property and a second image of the other UI state for a second setting of the UI property.

16. One or more computer-readable media storing computer-executable instructions that, when executed by one or more processors, cause the one or more processors to perform operations comprising:

determining a user interface (UI) state identifier (ID) for a UI state of a UI of a video game based at least in part on a plurality of node IDs corresponding to a plurality of nodes of a hierarchical structure of the UI;

determining a UI state map does not include a UI state map node corresponding to the UI state ID; and in response to the determining the UI state map does not include the UI state map node corresponding to the UI state ID, generating an updated UI state map including the UI state map node corresponding to the UI state ID.

17. The one or more computer-readable media of claim 16, the operations further comprising:

determining another UI state ID for another UI state of the video game;

determining, based on the other UI state ID, that the updated UI state map includes another UI state map node corresponding to the other UI state ID;

determining the updated UI state map does not include an edge from the UI state map node to the other UI state map node for an input associated with a transition from the UI state to the other UI state; and in response to the determining the updated UI state map does not include the edge from the UI state map node to the other UI state map node for the input associated with the transition from the UI state to the other UI state, generating another updated UI state map including the edge from the UI state map node to the other UI state map node for the input associated with the transition from the UI state to the other UI state.

18. The one or more computer-readable media of claim 16, wherein:

a node of the plurality of nodes of the hierarchical structure of the UI is an instance of a UI element; and a node ID of the node of the plurality of nodes of the hierarchical structure of the UI is based on a unique element ID of the UI element.

19. The one or more computer-readable media of claim 16, wherein a node ID of a node of the plurality of nodes of the hierarchical structure of the UI is based on a value or property associated with the node.

20. The one or more computer-readable media of claim 16, wherein determining the UI state ID for the UI state based at least in part on the plurality of node IDs corresponding to the plurality of nodes of the hierarchical structure of the UI is based at least in part on a hierarchical relationship of a first node of the hierarchical structure to a second node of the hierarchical structure.

* * * * *